US011774289B2

(12) United States Patent
Swett (10) Patent No.: US 11,774,289 B2
(45) Date of Patent: Oct. 3, 2023

(54) MICRO-ELECTROMECHANICAL SYSTEM (MEMS) INTERFEROMETER FOR FT-MIR SPECTROSCOPY

(71) Applicant: Saudi Arabian Oil Company, Dhahran (SA)

(72) Inventor: Dwight W. Swett, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 98 days.

(21) Appl. No.: 17/453,285

(22) Filed: Nov. 2, 2021

(65) Prior Publication Data

US 2023/0136082 A1 May 4, 2023

(51) Int. Cl.
*G01J 3/453* (2006.01)
*G01J 5/08* (2022.01)
*G02B 26/08* (2006.01)
*G02B 1/00* (2006.01)

(52) U.S. Cl.
CPC ........... *G01J 3/4532* (2013.01); *G01J 5/0853* (2013.01); *G02B 1/002* (2013.01); *G02B 26/0841* (2013.01)

(58) Field of Classification Search
CPC ..... G01J 3/4532; G01J 5/0853; G02B 11/002; G02B 26/0841
See application file for complete search history.

(56) References Cited

U.S. PATENT DOCUMENTS

| 7,796,267 B2 | 9/2010 | Saadany et al. |
| 8,531,675 B2 | 9/2013 | Khalil et al. |
| 8,792,105 B2 * | 7/2014 | Khalil ............... G01B 9/02091 356/497 |
| 11,371,933 B2 * | 6/2022 | Swett ..................... G01J 3/453 |
| 2011/0139990 A1 | 6/2011 | Xie et al. |
| 2016/0231172 A1 | 8/2016 | Medhat et al. |
| 2020/0025619 A1 | 1/2020 | Almasri et al. |
| 2020/0182781 A1 | 6/2020 | Sadek |

(Continued)

FOREIGN PATENT DOCUMENTS

EP    3390991 B1 *  7/2021  ............... G01B 7/08

OTHER PUBLICATIONS

O'Mahony et al., Analysis of material properties for MEMS using interferometric measurements, Aug. 27, 2003, Proc. SPIE vol. 4876, OPTO—Ireland 2002, pp. 1-2 (Year: 2003).*

(Continued)

*Primary Examiner* — David P Porta
*Assistant Examiner* — Casey Bryant
(74) *Attorney, Agent, or Firm* — Fish & Richardson P.C.

(57) ABSTRACT

A microelectromechanical (MEMS) interferometer is provided. The MEMS interferometer includes a pair of movable mirrors that are positioned along perpendicular axes, wherein each of the pair of movable mirrors is coupled to a mechanism. The mechanism includes an electrostatic actuator driving a displacement amplification mechanism, and the displacement amplification mechanism driving each of the pair of the movable mirrors. The MEMS interferometer includes a beam splitter that is positioned at an intersection of the perpendicular axes extending through each movable mirror and the beam splitter. The MEMS interferometer also includes a metasurface microbolometer placed in line with the beam splitter to measure an intensity of a recombined beam from the pair of movable mirrors.

24 Claims, 10 Drawing Sheets

(56) References Cited

U.S. PATENT DOCUMENTS

2021/0088819 A1* 3/2021 Dionne ............... G02B 1/115
2021/0396993 A1* 12/2021 Jin ..................... B81B 3/0045

OTHER PUBLICATIONS

Swett, Near Zero Index Perfect Metasurface Absorber using Inverted Conformal Mapping, Jun. 6, 2020, Scientific Reports, vol. 10, Art. No. 9731, pp. 1-14 (Year: 2020).*

U.S. Appl. No. 17/453,290, filed Nov. 2, 2021, Swett.

U.S. Appl. No. 62/946,363, filed Dec. 10, 2020, Swett.

Aske et al., "Determination of saturate, aromatic, resin, and asphaltenic (sara) components in crude oils by means of infrared and near-infrared spectroscopy," Energy & Fuels, Aug. 2001, (15)1304-1312, 9 pages.

Chai, "Review of MEMS Based Fourier Transform Spectrometers," Micromachines, 11, 214, Feb. 2020, 28 pages.

comsol.com [online], "MultiPhysics simulation software," available on or before Dec. 31, 2021, via Internet Archive: Wayback Machine URL <http://web.archive.org/web/20211231000821/https://www.comsol.com/comsol-multiphysics>, retrieved on Feb. 14, 2022, <https://www.comsol.com/comsol-multiphysics>, 9 pages.

Feng and Halterman, "Coherent perfect absorption in ultrathin epsilon-near-zero metamaterials induced by fast-wave non-radiative modes," American Physical Society, Phys. Rev. B, Oct. 2012, 86: 165103-1, 6 pages.

Jin et al., "Arbitrarily thin metamaterial structure for perfect absorption and giant magnification," Optics Express, 2011, 19(12): 11114-11119, 6 pages.

Li et al., "Miniature Fourier transform spectrometer based on wavelength dependence of half-wave voltage of a LiNbO3 waveguide interferometer," Opt. Lett., Jun. 2014, 39(13):3923-3926, 4 pages.

Parashar et al., "Three Cavity Tunable MEMS Fabry Perot Interferometer," Sensors, 7, 3071-3083, Dec. 2007, 14 pages.

Pergament et al., "Vanadium dioxide: Metal-insulator transition, electrical switching and oscillations, a review of state of the art and recent progress," Energy Materials and Nanotechnology (EMN) Meeting on Computation and Theory, Nov. 2015, 25 pages.

Souza et al., "Fourier transform spectrometer on silicon with thermo-optic non-linearity and dispersion correction," Nat. Commun., Feb. 2018, 9:665, 8 pages.

Swett, "Near Centimeter-scale FT-MIR Spectrometer based on NZIM Perfect Absorption using Inverted TanCirc Conformal Mapping Geometry," Research Square, Nov. 16, 2021, 19 pages.

Swett, "Near zero index perfect metasurface absorber using inverted conformal mapping," Scientific Reports 1O, 2020, 9731, 14 pages.

Takami et al., "High temperature-coefficient of resistance at room temperature in w-doped vo2 thin films on al2o3 substrate and their thickness dependence," Japanese Journal of Applied Physics, May 2011, 50(5R):055804, 4 pages.

Zheng et al., "High-resolution on-chip spectrometer with a tunable micro-ring resonator filter," Conf. Lasers ElectroOpt. 2, Jun. 2016, 2016 AM1J.2, 2 pages.

Zhong et al., "Perfect absorption in ultrathin anisotropic E-near-zero metamaterials," Applied Physics Letters, 2014, 105(1): 023504, 5 pages.

* cited by examiner

MICRO-ELECTROMECHANICAL SYSTEM (MEMS) INTERFEROMETER FOR FT-MIR SPECTROSCOPY

TECHNICAL FIELD

The present disclosure is directed to an interferometer for a Fourier transform infrared spectrometer. More specifically, the interferometer is based on a micro-electromechanical system (MEMS) used in conjunction with an uncooled near-zero index metasurface detector.

BACKGROUND

Infrared spectrometers have been deployed in a wide range of applications that benefit from non-invasive chemical analysis. For the oil & gas industry, the potential to migrate this technology into downhole logging application holds important benefits in the identification and analysis of in situ hydrocarbons particularly with respect to the mid-infrared regime which could allow real-time chemical analysis and quantification of saturate, aromatic, resin, and asphaltenic (SARA) components. However, the constraints on size and thermal control with existing miniaturization applications are relatively benign in comparison to those for downhole, which have been a significant obstacle to migration of the technology into oilfield sensing applications. For instance, the environmental conditions in downhole logging while drilling operations can exceed 175° C. and 200 MPa with sensor packages confined to less than a few centimeters in diameter. While production logging conditions are more benign, generally less than 125° C. and 100 MPa, still sensor packages less than a couple of centimeters in diameter are required. None of these type downhole applications are amenable to integration of the cryogenic cooling systems typical with laboratory grade detectors.

SUMMARY

An embodiment described in examples herein provides a micro-electromechanical system (MEMS) interferometer. The MEMS interferometer includes a pair of movable mirrors that are positioned along perpendicular axes, wherein each of the pair of movable mirrors is coupled to a mechanism. The mechanism includes an electrostatic actuator driving a displacement amplification mechanism, and the displacement amplification mechanism driving each of the pair of the movable mirrors. The MEMS interferometer includes a beam splitter that is positioned at an intersection of the perpendicular axes extending through each movable mirror and the beam splitter. The MEMS interferometer also includes a metasurface microbolometer placed in line with the beam splitter to measure an intensity of a recombined beam from the pair of movable mirrors.

DETAILED DESCRIPTION

With the lack of infrared spectroscopic devices adaptable to the constraints of downhole application, realization of the concept for "FT-IR on a chip" in the form of an uncooled miniaturized laboratory grade infrared spectrometer would have disruptive effects on in situ downhole chemical analysis in the oilfield. Development of an uncooled MEMS based interferometer is a critical initial step.

Embodiments described herein provide a monolithic silicon MEMS interferometer utilizing an uncooled metasurface absorber detector to enable a substantial size reduction in an FTIR amenable for downhole application. The techniques may be used to provide chemical spectroscopy downhole in a wellbore in real-time. The metasurface absorber detector has unusual electromagnetic absorption properties that enable laboratory quality detectivity at higher temperatures than other detectors.

The metasurface elemental structure is derived from a geometric inversion of the canonical Rhodonea, or more commonly four-leaf roses, conformal mapping contours and was found to exhibit a near zero index metamaterial (NZIM) behavior. The near zero index properties of the metasurface lead to an absorption phenomenon characterized by surface plasmon resonances that confine the absorption mechanism within the ultrathin ($\lambda/375$) metasurface plane and make the absorption properties of the microbolometer design relatively insensitive to moderate changes of the material properties of the remaining laminae.

Accordingly, this unusual feature allows the metasurface to be integrated on a single $VO_2$ material thermometric layer which can then be operated at downhole elevated temperatures within the $VO_2$ metal-insulator-transition region. Within this region the $VO_2$ layer exhibits more than an order of magnitude enhancement in its ambient thermometric properties.

Figure 1:
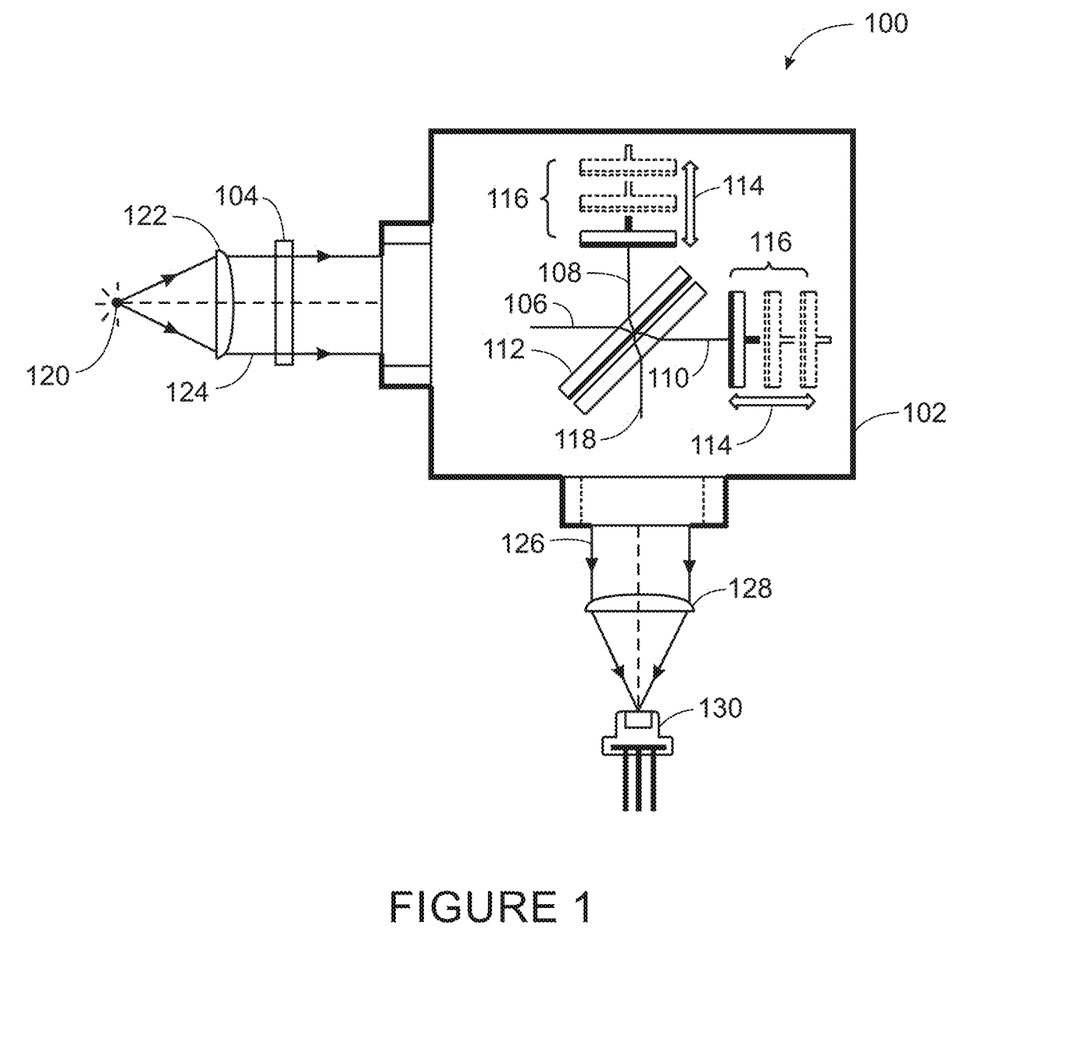
FIG. 1 is a schematic diagram of a Fourier transform infrared (FTIR) spectrometer including a micro-electromechanical system (MEMS) interferometer.

This provides detector performance levels that, using other types of detectors, would be achievable only with cryogenic cooling. As these technologies are limited to laboratory environments, the metasurface microbolometer represents a significant advancement, enabling uncooled IR spectroscopy using miniaturized sensor devices. These devices may be used in any number of field type applications, such as oilfield exploration and production applications FIG. 1 is a schematic diagram of a Fourier transform infrared (FTIR) spectrometer 100 including a micro-electromechanical system (MEMS) interferometer. Fourier transform infrared spectroscopy generally uses an interferometer, such as a Michelson interferometer based on MEMS technology, termed a MEMS interferometer 102 herein, to collect data on a sample 104 based on path length differences. After collection, the data is processed using a Fourier transform resulting in an IR spectrum.

The operation of the MEMS interferometer 102 is based upon separating an incident or input beam 106 of radiation into two beams 108 and 110 by means of a beamsplitter 112, whereupon a path length difference between the separated beams is introduced by antisymmetric movement 114 of both of two reflecting elements, for example, a pair of mirrors 116. The path length difference creates constructive and destructive interference in the recombined beam 118 at the beamsplitter 112.

Thus, radiation originating from a source 120 passes through input optics 122, forming an approximately collimated input beam 124. The approximately collimated input beam 124 passes through the sample 104 and into the MEMS interferometer 102. The constructive and destructive interference of the recombined beam 118 results in a change in the intensity of the output beam 126 as a function of the relative path length difference, termed an interferogram. The output beam 126 is passed through output optics 128 to be focused on a detector 130, such as the metasurface microbolometer described herein.

The intensity of the interferogram can be monitored as a function of path difference, for example, the relative displacement of the reflecting elements over time, using the detector 130. Fourier transformation techniques are applied to the raw interferogram data to convert the spectra from the relative displacement domain to the wavelength domain, resulting in an absorption spectrum. The absorption spectra can be analyzed to determine the chemical composition of the sample.

As described herein, decreasing the size of the FTIR is a prerequisite to their widespread deployment in environments with limited space, such as downhole. Miniaturization of infrared spectrometers has been difficult due to the need for cryogenically cooled detectors, limitations of the space available for downhole logging devices, and the development of instruments having sufficient spectral resolution to discriminate between the varieties of chemicals that may be encountered in a wellbore.

A significant impediment for achieving high quality mid-IR (MIR) spectroscopy, as determined by spectral range, is the need for cooling of most detector technologies. Generally, uncooled detectors have limited responsiveness in longer wavelength regimes, such as in the mid-IR range, for example, 250 wavenumbers ($cm^{-1}$) to 2000 $cm^{-1}$. The design of the metasurface may be adjusted or tuned to cover other spectral ranges, for example, by changing the size of the features in the pattern. Thus, as described herein, a detector formed using a metamaterial can provide the needed detectivity without cooling.

Generally, metamaterials may be used to obtain effective properties at any specific frequency, by manipulating the design of subwavelength resonator elements, or shapes, of the metamaterial. Accordingly, obtaining the desired properties in the metamaterial is a matter of development of the appropriate geometric elements for the frequency range and electromagnetic response of interest. As described herein, a metamaterial for infrared sensing is based upon thermal detection using arrays of very small thermal mass detector elements that interact with one or more electromagnetic modes. These are used to make broadband devices for spectroscopic chemical detection which rely upon the tailored broadband characteristics of the metamaterial design. In embodiments described herein, the metamaterials are used in uncooled MIR microbolometer technologies in performance regimes currently occupied by cryogenically cooled detector systems. Further, in various embodiments, the microbolometer detector 130 is incorporated into a miniaturized Michelson interferometer based on a microelectromechanical system (MEMS), termed a MEMS interferometer 102, herein.

Figure 2A:
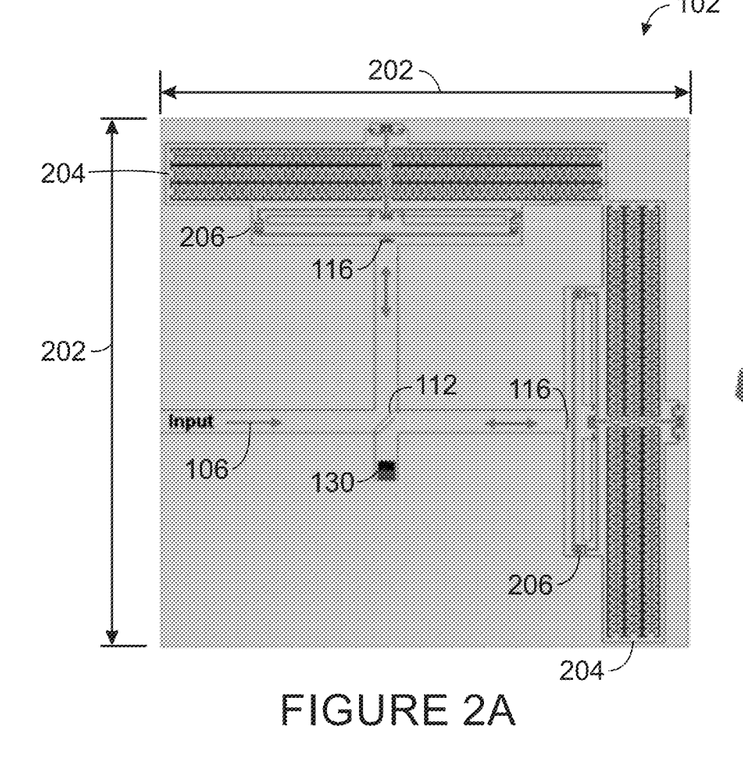
FIGS. 2A and 2B are schematic diagrams of a micro-electromechanical system (MEMS) interferometer included in the FTIR.
Figure 2B:
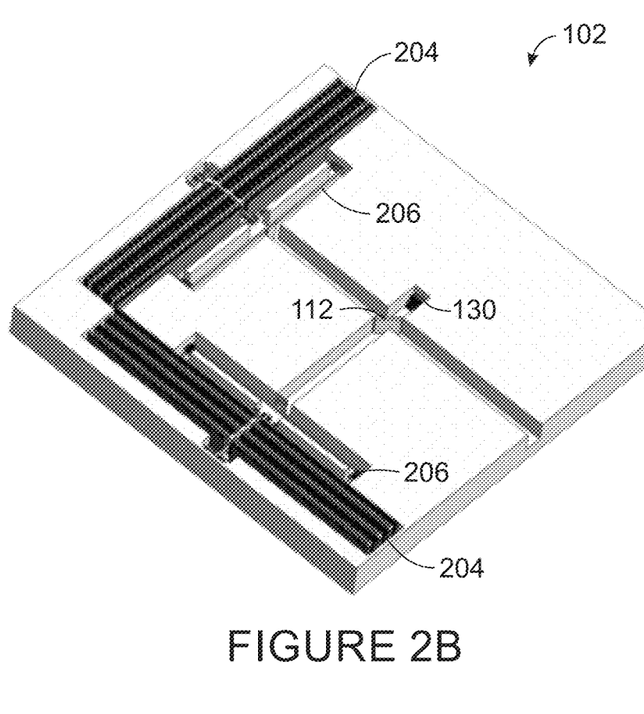

FIGS. 2A and 2B are schematic diagrams of a microelectromechanical system (MEMS) interferometer 102 included in the FTIR. Like numbered items are as described with respect to FIG. 1. FIG. 2A is a top view of the MEMS interferometer 102, while FIG. 2B is a perspective view of the MEMS interferometer 102. In various embodiments, the MEMS interferometer 102 is formed into a single monolithic chip or block of substrate, with dimensions 202 of about 12 mm×12 mm.

As described herein, in various embodiments the FTIR MIR spectrometer is based on a metasurface microbolometer, used as the detector 130, which exhibits good absorption in the biological "fingerprint" region of the electromagnetic spectrum, e.g., from about 500 $cm^{-1}$ to about 2000 $cm^{-1}$. This region is useful for identifying and analyzing many hydrocarbons and wellbore fluids. The MEMS interferometer 102 utilizes a pair of mechanisms that drive movable micromirrors, or mirrors 116. Each mechanism includes an electrostatic actuator 204 on the chip that drives a mirror 116 through a displacement amplification mechanism 206. Each mirror 116 is placed along a perpendicular axis extending through a beamsplitter 112. The input beam 106 is divided by the beamsplitter 112 and sent to each movable mirror 116, then recombined to create constructive and destructive interference in a beam from the beamsplitter 112 to the detector 130. As described herein, in various embodiments the detector 130 is a metasurface detector that does not require cryogenic cooling.

The displacement amplification mechanism 206 increases the spectral resolution of the MEMS interferometer 102 by increasing the amplitude of the motion of each mirror 116. The displacement amplification mechanism 206 increases the motion of each mirror 116 by a ratio of about 8.8:1 over the input motion from the electrostatic actuator 204. This is described in further detail for a single mechanism with respect to FIGS. 3A and 3B.

Figure 3A:
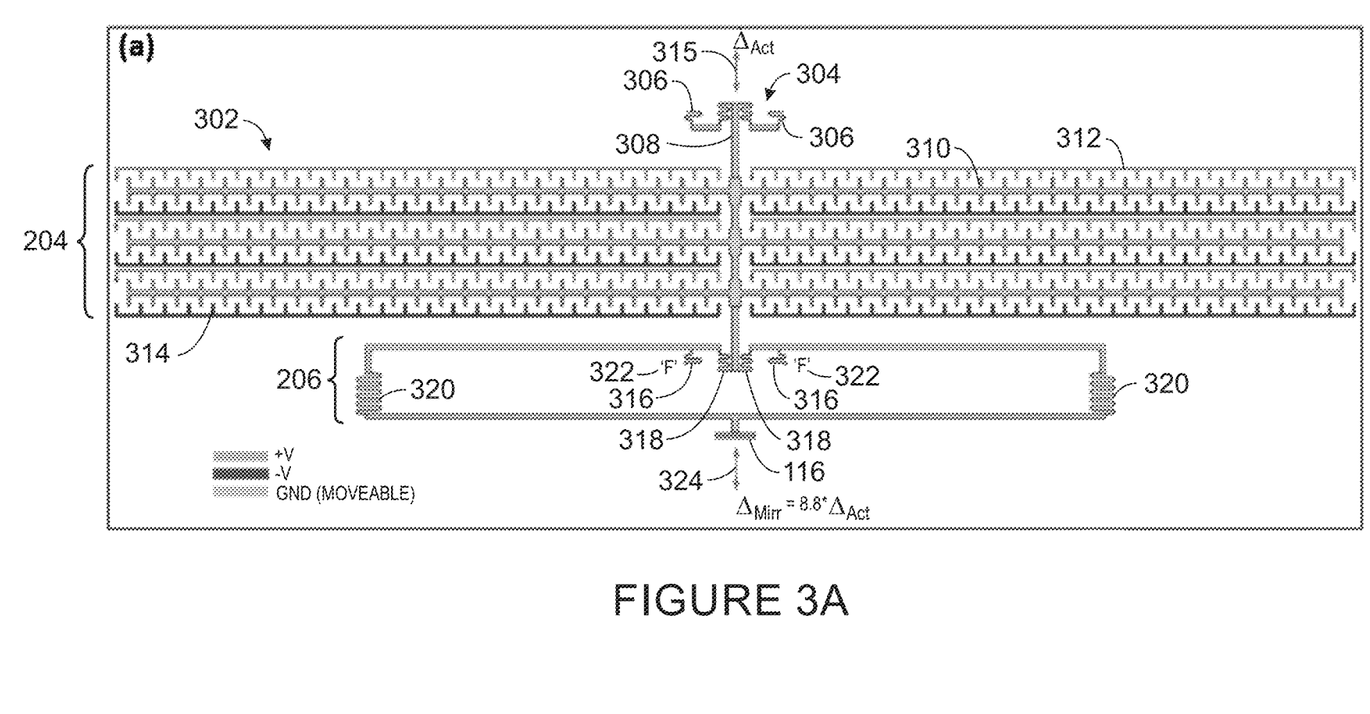
FIGS. 3A and 3B are cross-sections of the mechanism used for moving each mirror in the MEMS interferometer.
Figure 3B:
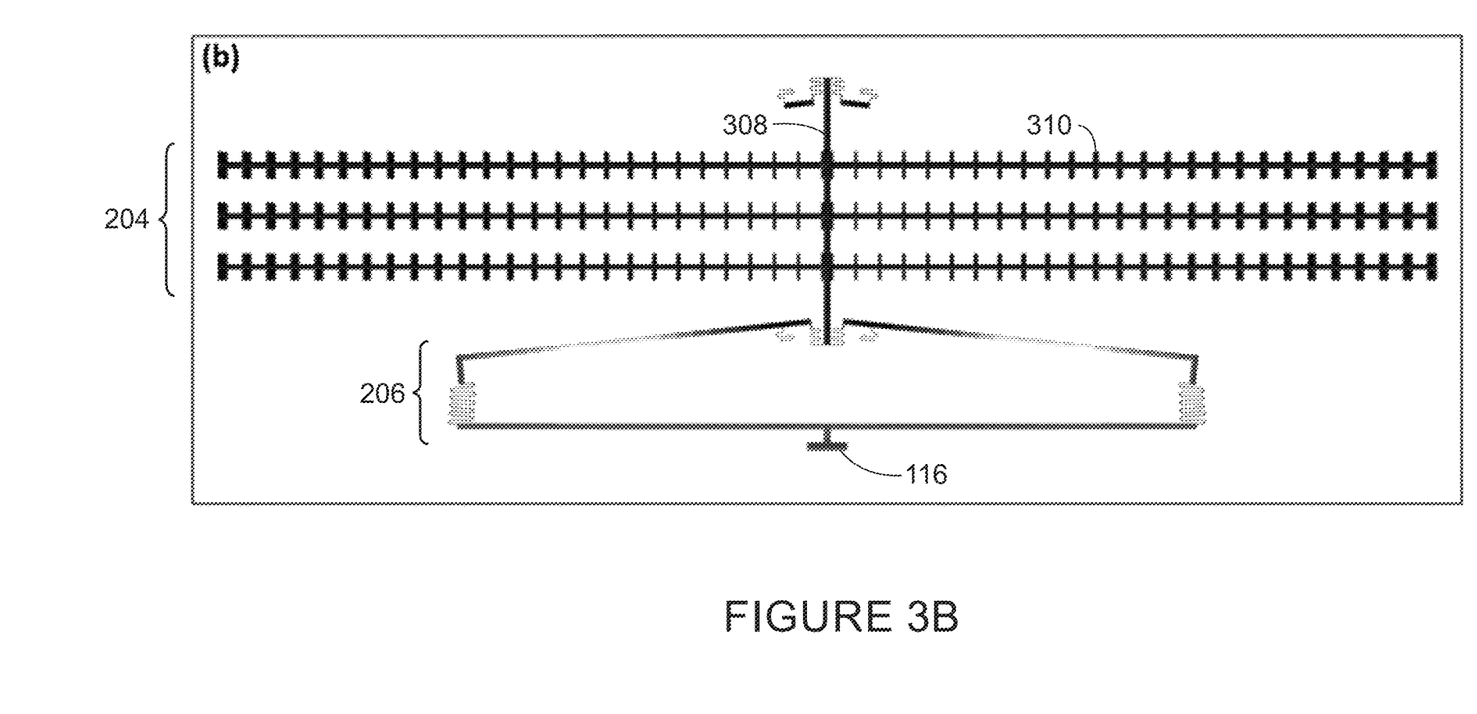

FIGS. 3A and 3B are cross-sections of the mechanism used for moving each mirror 116 in the MEMS interferometer 102. Like numbers are as described with respect to FIGS. 1 and 2. Each mirror 116 is controlled by a coupled electrostatic actuator 204 that uses a comb drive mechanism 302.

The motion of the electrostatic actuator 204 drives the displacement amplification mechanism 206. The comb drive mechanism 302 includes a sway stabilizer 304 that is attached to the substrate at two attachment points 306. As described herein, the sway stabilizer 304 assists in keeping the motion of the comb drive mechanism 302 linear at high drive voltages. The comb drive mechanism 302 includes a central actuator 308 that is attached to movable combs 310 that has grounded tines that are positioned between tines extending from positive combs 312 (positive tines) and negative combs 314 (negative tines), which are fixed in place. Each tine from the movable comb 310 is positioned about 70 μm from a tine on one of the other combs 312 or 314. Applying a voltage potential between the positive combs 312 and the negative combs 314 will cause the movable combs 310 to oscillate between the positive combs 312 and the negative combs 314, moving the central actuator 308. The amplitude 315 of the motion is proportional to the potential difference between the positive combs 312 and the negative combs 314.

As described herein, the displacement amplification mechanism 206 amplifies the motion of the comb drive mechanism 302 to increase the total displacement of the mirror 116. The displacement amplification is created through the combination of a symmetric fulcrum about the axis of the central actuator 308 and three pairs of serpentine moment release flexures 316, 318, and 320. The comb drive mechanism 302 imparts motion on the central actuator 308, which activates the fulcrum lever about the constraint, or attachment, points 322 resulting in an amplification of the motion 324 at the mirror 116. The three pairs of serpentine moment release flexures 316, 318, and 320 are designed to function as quasi-perfect hinge joints at each location. The degree of departure from the perfect hinge moment release degrades the mirror and actuator amplification ratio of the motion 324 of the mirror 116. For the idealized case in which the three pairs of serpentine release flexures 316, 318, and 320 could be replaced by perfect ball-joints, the amplification ratio would be approximately 10:1 whereas in the practical design case involving the serpentine release flexures 316, 318, and 320 as built, the amplification ratio of the motion 316 of the central actuator 308 is about 8.8:1, due to the incomplete release of the moment constraints.

The sway stabilizer 304 allows an increase in the vibrational loading at which the comb drive mechanism 302 experiences lateral instability. The sway stabilization 304 mechanism is integrated at the extreme location of the central actuator 308 from the displacement amplification mechanism 206.

FIG. 3B is a schematic diagram of the motion of the mirror 116. As illustrated FIG. 3B, a displacement of about 18.6 micrometers (μm) is increased to about 164.9 μm by the action of the amplification mechanism. Thus, with the amplification of the motion of the two moveable mirrors the total motion is about 329.8 μm, which provides an interferometric spectral resolution of about 15 cm−1 over the mid-IR spectral range of 2000-500 cm−1.

Figure 4A:
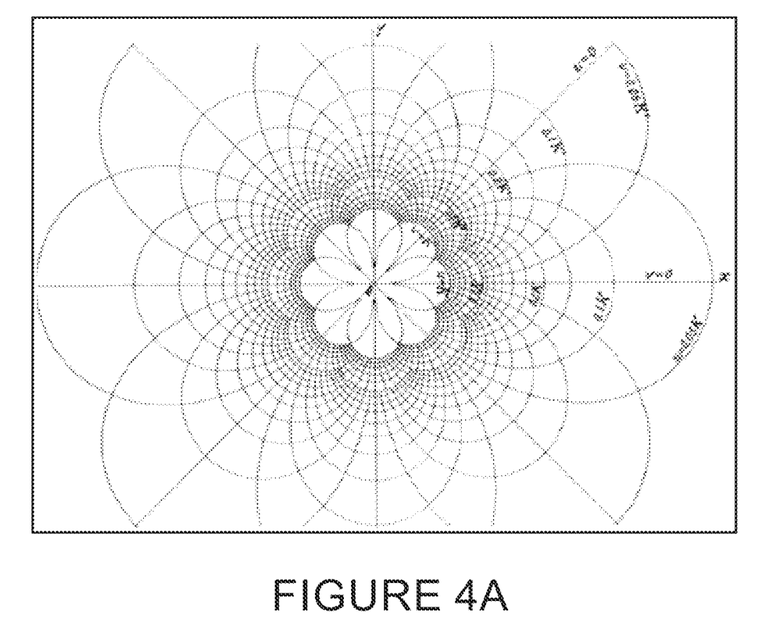
FIGS. 4A, 4B, 4C, and 4D are drawings showing the metasurface geometry of the detector.

FIGS. 4A, 4B, 4C, and 4D are drawings showing the metasurface geometry of the microbolometer or detector 130. FIG. 4A is a drawing of the geometry for the rhodonea conformal mapping contours.

Figure 4B:
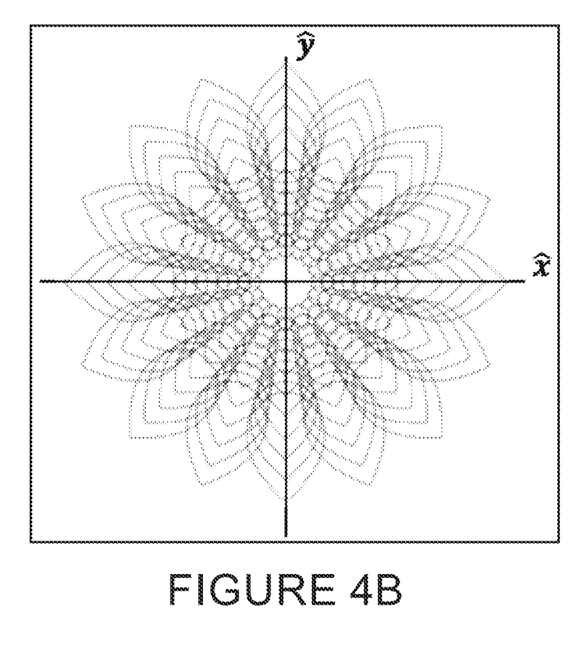
Figure 4C:
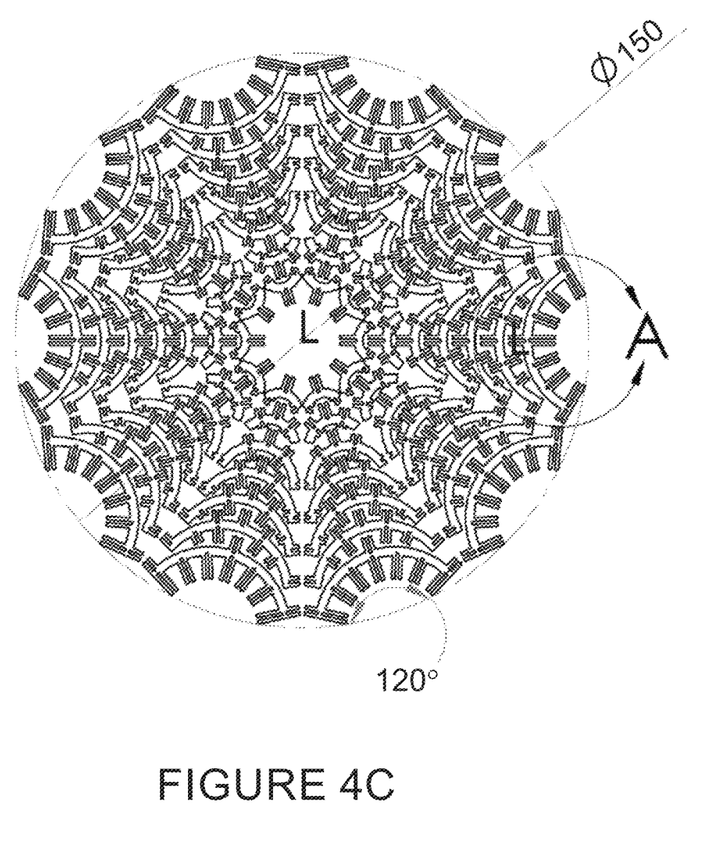
Figure 4D:
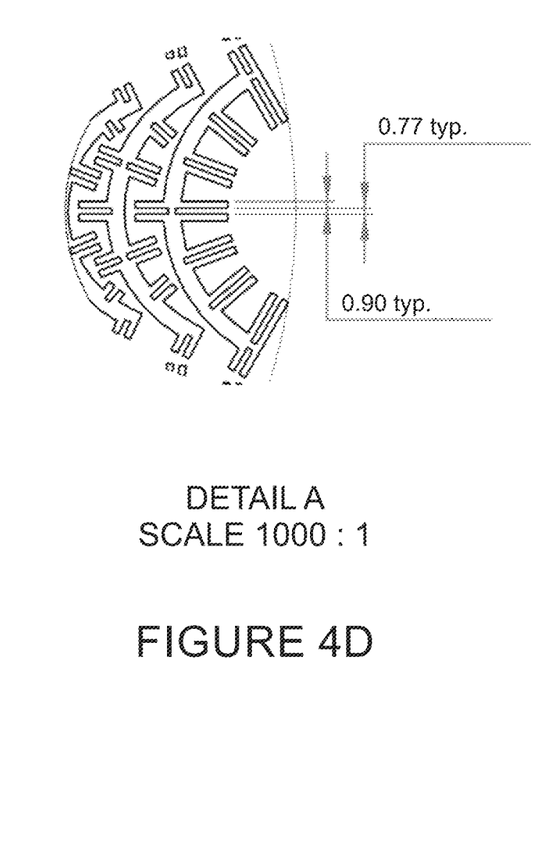

As described herein, the metasurface is derived from a geometric inversion of the rhodonea conformal mapping contours, shown in FIG. 4A, or more commonly called four-leaf roses, conformal mapping contours. FIG. 4B shows the pattern after geometrical inversion of the base conformal contours. The metasurface detector is based upon an electrically conductive geometric pattern imprinted onto the surface of a dielectric substrate ($Si_3N_4$) then both formed on a single layer of thermometric material ($VO_2$) using the pattern of FIG. 4B. FIG. 4C is a drawing of the final metasurface geometry formed along the inverted contours, wherein the dimensions are in microns. FIG. 4D is a magnified view of a portion of the metasurface, showing the patterns used for the present wavenumber range. The metasurface develops more than 90% infrared absorption in the biological "fingerprint" region, for example, in the wavenumber range of about 1500-600 cm$^{-1}$.

The metasurface was found to exhibit a near zero index metamaterial behavior. The near zero index properties of the metasurface lead to an absorption phenomenon created by surface plasmon resonances. This phenomenon confines the absorption to the ultrathin metasurface, which makes the absorption properties of the detector practically independent of the material properties of the remaining materials that may comprise the microbolometer. This allows integration of the metasurface absorber with a common thermometric material layer, undoped $VO_2$, which exhibits a metal-insulator-transition (MIT) region. In the region where the thermometric material is transitioning from an insulator to an electrically conductive metal, the thermometric properties improve by more than an order of magnitude. This allows for the performance of an uncooled detector technology to reach levels previously requiring active cooling.

The detector is based on the integration of the metasurface absorber in a microbolometer construction with a single $VO_2$ material thermometric layer that is temperature controlled to operate at 60° C., for example, within the metal-insulator-transition region. Within this transition region the $VO_2$ layer has effectively transitioned from a dielectric to a metallic electrical conductor and acquires more than a 50 fold enhancement in the thermometric properties compared to the room temperature dielectric state. Thus, by controlling the detector cavity temperature at 60° C., the detectivity performance matches or exceeds conventional detector technologies cooled at cryogenic conditions, for example, at less than about −200° C. As a result, in some embodiments the detector technology described herein enables a downhole spectroscopic instrument with performance matching lab instruments.

Figure 5:
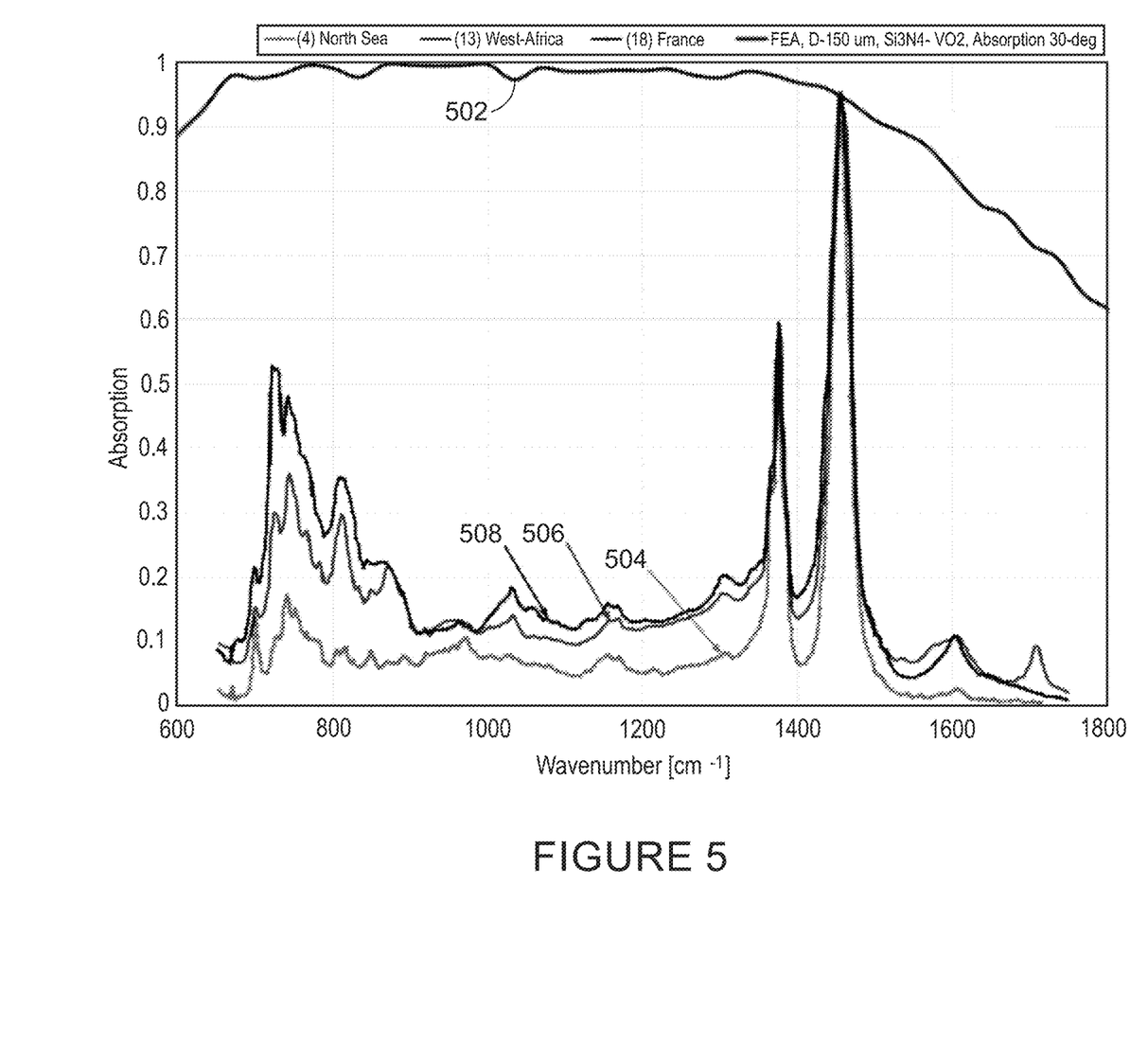
FIG. 5 is a plot showing the absorption spectrum for three crude oils, each from different global reservoirs with the absorption spectrum for the metasurface superimposed.
Figure 6A:
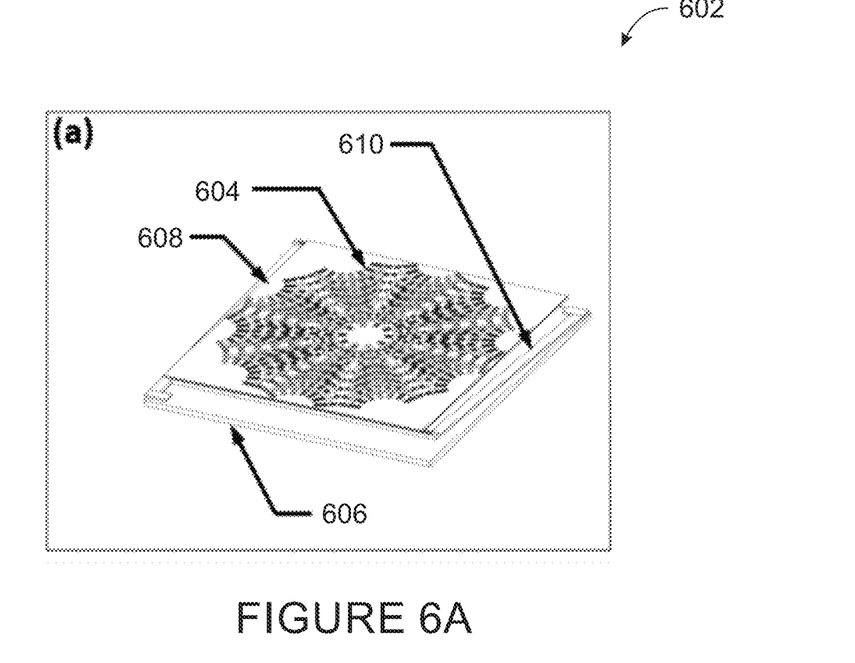
FIGS. 6A and 6B are drawings of an uncooled microbolometer using a metasurface geometry.
Figure 6B:
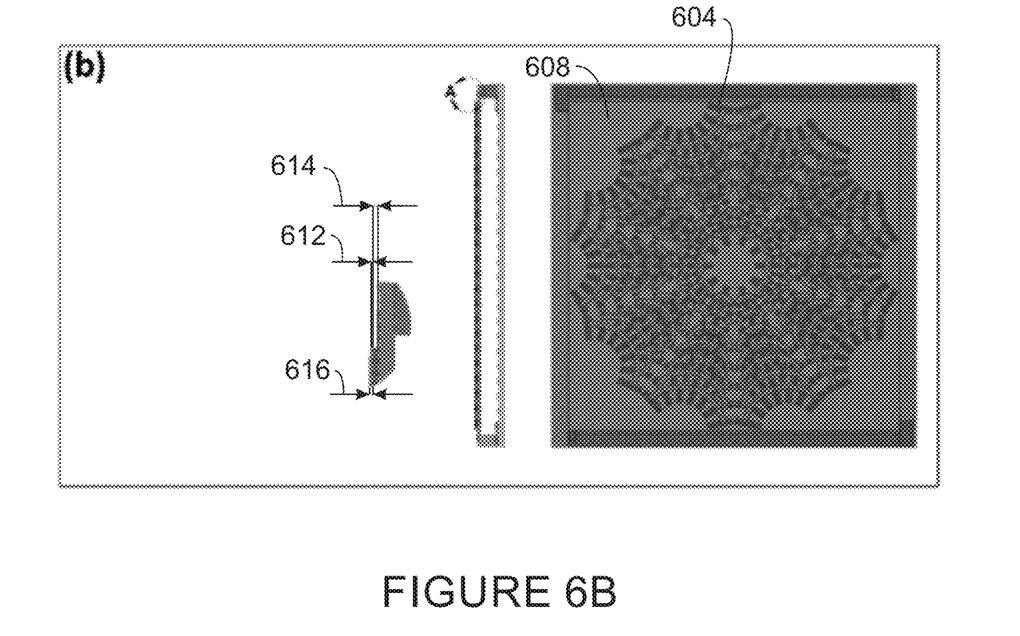

FIG. 5 is a plot showing the absorption spectrum for three crude oils, each from different global reservoirs. The SARA fractions (saturate, aromatic, resin, and asphaltene) for the crude oil samples are summarized in Table 1. As can be seen in the plot, the detectivity 502 of the metasurface detector, using a detector with a 150 μm diameter formed from a layer of $VO_2$ on $Si_3N_4$ would be sufficiently high to characterize all three crude oil samples. The uncooled microbolometer as described with respect to FIG. 6, exhibits a predicted maximum absorption of 99.5% at 870 cm−1 and an absorption bandwidth of 150% full-width at half-maximum (FWHM) on 1070 cm−1 center wavenumber, coincident with important chemical spectra of downhole hydrocarbons as shown in the spectra overlay plot of FIG. 5. The spectra in FIG. 5 show the differences between crudes of different SARA fractions, and emphasize the high distinctions that exist in the lower wavenumber range below 1000 cm−1 in which the metasurface absorptivity remains generally above 95%.

TABLE 1

SARA fractions of three crude oil samples

| Origin | Saturates (wt. %) | Aromatics (wt. %) | Resins (wt. %) | Asphaltenes (wt. %) | Density (g/cc) | Reference Number |
|---|---|---|---|---|---|---|
| North Sea | 82.7 | 13.4 | 3.9 | 0 | 0.839 | 504 |
| West Africa | 42.4 | 36.1 | 20.5 | 1 | 0.921 | 506 |
| France | 24.2 | 43.4 | 19.9 | 12.4 | 0.939 | 508 |

FIGS. 6A and 6B are drawings of an uncooled microbolometer 602 using a metasurface geometry. For in situ downhole chemical analysis applications, a sample rate on the order of once every second or so is minimally acceptable. For the 15 cm−1 resolution achievable with the described MEMS FT-MIR interferometer and a minimum modulation frequency of 500 Hz, a 1 Hz sample rate to analyze the chemical spectral range of about 2000-500 cm−1 constrains the system to using only four interferogram sweeps per sample. This limited number of interferogram sweeps may not provide sufficiently low noise levels in the analysis spectra and the eventual applications may constrain the operation to lower frequency sample rates below 1 Hz.

Thus, in some embodiments, a much higher modulation frequency is used. For a 1000 Hz modulation frequency, the corresponding number of interferogram sweeps increases to eight, which should provide a lower noise level in the analysis spectra. This option though does degrade the detectivity of the sensor by about 35% so a trade-off in analysis would be required.

The change in resistance of the thermometric layer due to a temperature change caused by the absorption of radiation by the metasurface 604 is the response (or intensity) measured by the readout integrated circuit (ROIC) 606 in the form of a change in voltage drop across the contacts of the bridge under constant bias current. The bridge structure, including the metasurface 604, dielectric substrate 608 and the thermometric layer (located underneath the dielectric substrate 608), is suspended over the ROIC 606 with an air gap using a set of thermal isolators 610 in order to minimize the thermal conduction path to heat generated in the absorbing layer, allowing the ROIC 606 to compound the effects of incident radiation and enhance the electrical signal created in response to changing field thermography.

A reduced thermal conduction path, though, must be balanced against increasing the thermal time constant and reducing the responsiveness to changing incident radiation. The mass of the bridge structure can be reduced in order to improve the response time, but may decrease electromagnetic absorptivity and increase voltage noise level on the detector. More rapid frame rates limit responsivity and detectivity while increased temperatures contribute to noise levels. Thus, high performance applications involving near-background radiation limited performance at rapid frame rates have been limited in practice to systems with active cooling. The predicted detector performance characteristics from integration of the inverted rhodonea geometry metasurface into a conventional uncooled microbolometer architecture can be determined, providing a figure of merit.

Detector Figures of Merit

In order to make a normalized comparison of the performance of different detectors, three parameters are generally used as figures of merit. These are voltage responsivity ($R_v$), signal to noise detectivity ($D^*$), and total voltage noise level, usually given in terms of a noise equivalent difference temperature (NEDT). The voltage responsivity, $R_v$, is a function of the output voltage signal and the temperature responsivity with changes in incident electromagnetic flux on the detector, and is given by the relation shown in Equation 1.

$$R_v = I_b R \beta R_T = I_b R \beta \frac{\Delta T}{\Delta \phi_0} \quad (1)$$

In Equation 1, $I_b$ is the bias current (amps, A), R is the bolometer electrical resistance (ohms, $\Omega$), $\beta$ is the thermometric layer temperature coefficient of resistance (TCR, 1/K), $R_T$ is the temperature responsivity of the detector (K/W), $\Delta T$ is the complex variation in temperature of the detector (K), and $\Delta \phi_0$ is the complex variation in incident radiation (W).

The detector signal to noise detectivity $D^*$ is defined as shown in Equation 2.

$$D^* = R_v \sqrt{\frac{A_d}{4kTR + \alpha_H \left[\frac{I_b^2 R^2}{Nf}\right]}} \quad (2)$$

In equation 2, $A_d$ is the detector area confronting the incident radiation, k=1.38×10−23 n−m/K (Boltzmann's constant), T is the absolute temperature (K) of the bridge structure, $\alpha_H$=0.002 (Hooge coefficient for homogenous semiconductor films), f is the modulation frequency, and N is the number of free carriers (electrons) in the thermometric material.

The noise equivalent difference temperature (NEDT) denotes the temperature change of a detector due to incident radiation that corresponds to an output signal equal to the RMS total noise level (a signal-to-noise ratio of 1). This is a fundamental parameter of the detector performance and represents the minimum temperature difference that can be discerned above the background noise. The NEDT is defined as shown in Equation 3.

$$NEDT = \Delta V_n \frac{\Delta T}{\Delta V_s} = \Delta V_n \frac{R_T}{R_v} \quad (3)$$

In Equation 3, $\Delta V_s$ is the voltage change for a temperature change of $\Delta T$ on the detector, and $\Delta V_n$ is the root mean square (RMS) total noise voltage level as calculated by the relation shown in Equation 4.

$$\frac{\Delta V_n^2}{\Delta f} = 4kTR + \alpha_H \left[\frac{I_b^2 R^2}{Nf}\right] \quad (4)$$

In equation 4, f is the modulation bandwidth.

In one embodiments, the metasurface detector design is based upon integration with a dielectric layer 608 formed of a single layer of $Si_3N_4$ of about 200 nm in thickness 612. The thermometric layer of $VO_2$, located under the dielectric substrate 608, is about 500 nm in thickness 614. This is enabled by the low mass loading of the metasurface 604, which is a gold layer of about 120 nm in thickness 616. Specifically, the metasurface geometry has a 35% fill factor within a 150 µm diameter. As used herein, fill factor represents the amount of active material in the pattern of the metasurface 604, for example, the gold forming a metasurface.

In another embodiment, the detector 602 has the dimensions shown in Table 1. In this embodiment, the thermometric layer of $VO_2$ is about 35 nm in thickness 614, the dielectric substrate of $Si_3N_4$ is about 100 nm in thickness 612, and the metasurface 604 is about 27 nm in thickness 616. As a result, the mass loading develops a maximum bending stress in the substrate of 6.3 kPa/g. The tensile strength of the $VO_2$ substrate is $\alpha_{ult}$=172 MPa giving an ultimate shock acceleration capability of greater than about 27000 g's, which is greater than required to sustain the expected worst case shock loads that could be experienced downhole in a production logging environment, for example, less than about 100 g's. As a result, confinement to single thermometric and dielectric layers is acceptable with this ultrathin metasurface for the expected downhole vibration and shock environments.

TABLE 1

Summary of metamaterial microbolometer design properties (f = 500 Hz, Δf = 10 Hz).

| | |
|---|---|
| $Si_3N_4$ dielectric substrate dimensions | 152 × 152 × 0.100 µm³ |
| $VO_2$ thermometric substrate dimensions | 152 × 152 × 0.035 µm³ |
| Metasurface envelope | ≈ 150 × 0.027 µm³ |

TABLE 1-continued

Summary of metamaterial microbolometer design properties
(f = 500 Hz, Δf = 10 Hz).

| Maximum Absorption | 99.5% |
|---|---|
| Ti electrode dimensions (4) | 1 × 0.5 × 150 μm³ |
| Resistance, R | 9910 Ω |
| Bias Current, $I_b$ | 75 μA |
| Resistive Temperature Rise, $\Delta T_{Ib}$ | 2 K |
| TCR, β | 0.859 1/K @ 60° C. |
| Thermal Conductance, $G_{th}$ | 3.0 × 10⁻⁷ W/K |
| Thermal Capacitance, $C_{th}$ | 7.8 × 10⁻⁹ J/K |
| Thermal Time Constant, $\tau_{th}$ | 26 ms |
| NEDT | 1 mK |
| Maximum Responsivity, $R_v$ | 26 kV/W |
| Maximum Detectivity, D* | 1.06 × 10¹⁰ cm√Hz/W @ 500 Hz |

Figure 7A:
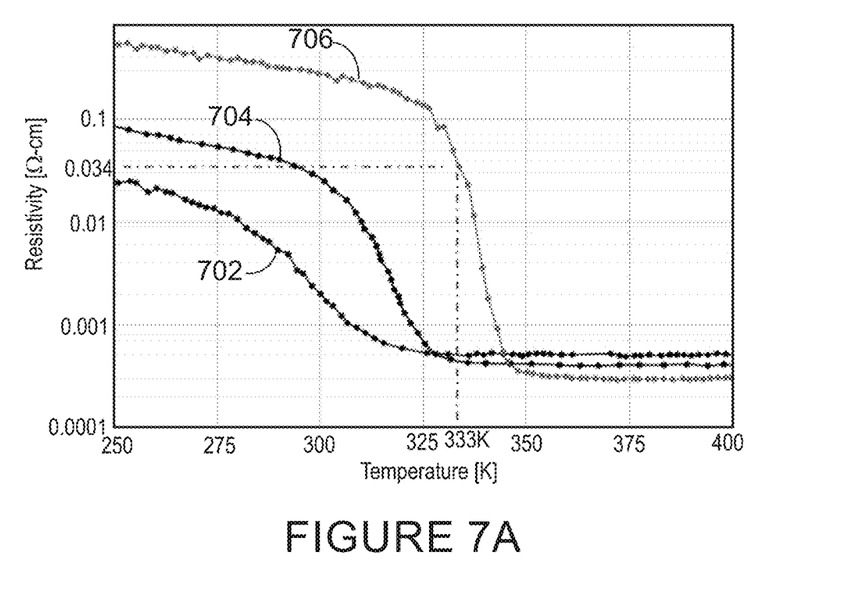
FIGS. 7A and 7B are plots showing a comparison of the thermometric properties for doped vanadium oxide (VO2) films and an undoped vanadium oxide (VO2) film.
Figure 7B:
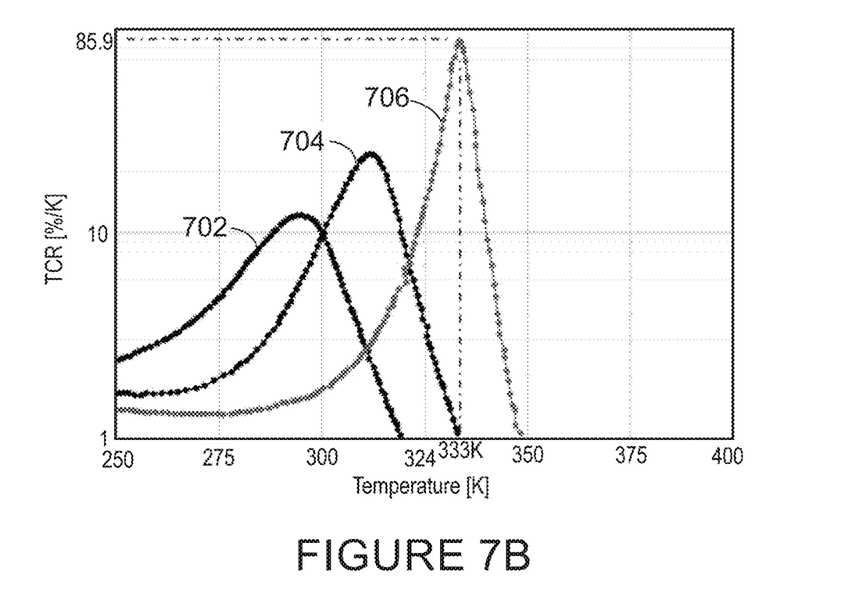

FIGS. 7A and 7B are plots showing a comparison of the thermal properties for doped vanadium oxide (VO2) films 702 and 704 and an undoped vanadium oxide (VO2) film 706. FIG. 7A shows plots of the temperature dependence of electrical resistivity. FIG. 7B shows plots of the temperature dependence of the thermal coefficient of resistance (TCR).

The normalized detectivity (D*) as given by Equation 2 is dependent upon the electrical resistivity and thermal coefficient of resistance of the thermometric $VO_2$ layer, while the noise equivalent difference temperature (NEDT) as given by Equation 3 is dependent upon the specific carrier density. The plots in FIG. 7 clearly illustrates the metal-insulator-transition (MIT). For undoped $VO_2$ film 706 the data in FIG. 7A indicates a resistivity at 60° C. (333 K) of about 3.4×10⁻² Ω-cm. The theoretical electron density of $VO_2$ has been calculated to be about 4×10¹⁸/cm³. Using these material properties for the $VO_2$ thermometric layer, along with Equation 1 for responsivity $R_v$, Equation 2 for normalized detectivity (D*), and Equation 3 for noise equivalent difference temperature (NEDT) and simulation results for the metasurface absorptivity (using the MultiPhysics simulation software available from Comsol® of Stockholm, Sweden) predictions can be made for the metasurface detector performance figures of merit. Using the detector figures of merit as a set of discriminators, a series of analytical trade-off studies was conducted to optimize detector performance for a controlled detector cavity temperature of 60° C. and 500 Hz modulation frequency. The optimized detector figures of merit are detectivity (D*) of 1×10¹⁰ cm*sqrt (Hz)/W at 333 K, and an NEDT of 1 mK. The results are based upon 75 μA bias current, which creates a latent resistive temperature rise of 2.0 K in the microbolometer.

Figure 8:
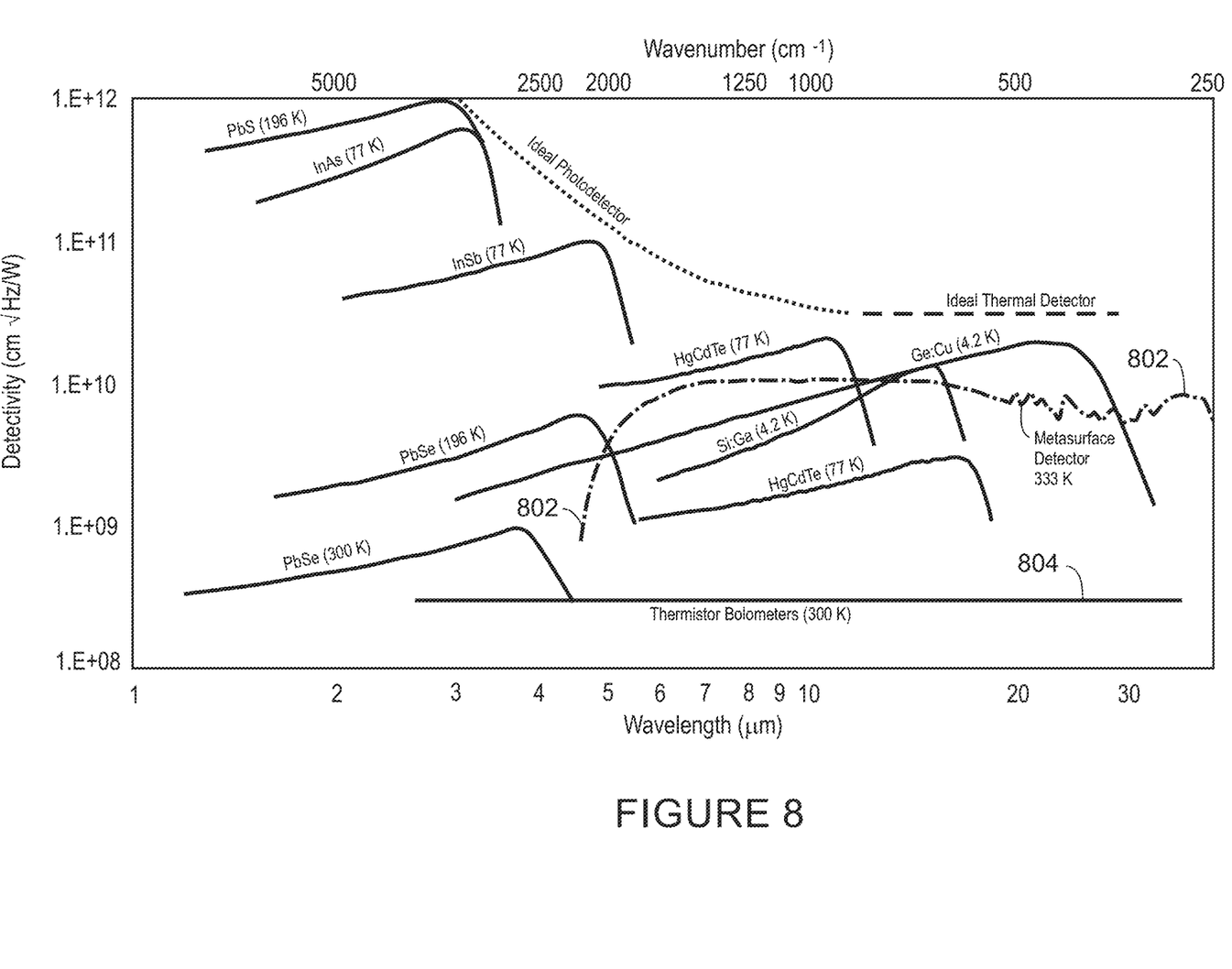
FIG. 8 is a plot showing a comparison of spectral detectivity for the metasurface detector, in comparison to various commercially available IR detectors operated at different temperatures.

FIG. 8 is a plot showing a comparison of spectral response for the metasurface detector 802, in comparison to various commercially available IR detectors operated at different temperatures. The modulation frequency for all detectors is 1000 Hz, except for the state of the art uncooled thermistor bolometers 804 at 10 Hz and the metasurface detector 802 at 500 Hz.

The direct comparison in FIG. 8 includes the detectivity spectrum of the metasurface detector at 500 Hz modulation frequency superimposed onto the spectra for various commercially available infrared and THz detector technologies operated at the noted temperatures and over the wavenumber range from 10000-250 cm−1. The superimposed metasurface microbolometer spectrum indicates a maximum detectivity D* of 1.0×10¹⁰ cm*sqrt(Hz)/W, which is comparable to the performance for the state of the art cryogenically cooled detectors.

In this work we present a mid-IR perfect metasurface absorber (PMA) design formed from a geometric inversion of the rhodonea conformal mapping contours. The PMA behaves as a near zero index metamaterial (NZIM) having intrinsic multiple coupled absorption resonances that combine to form broadband infrared absorption characteristics of more than 90% in the wavenumber range 1500-600 cm−1. An uncooled microbolometer design is described that uses the metasurface geometry imprinted on a single $Si_3N_4$ dielectric substrate with a single $VO_2$ thermometric substrate leading to a mid-IR detector with predicted maximum absorption of 99.5% at 870 cm⁻¹ and an absorption bandwidth of 156% full-width half-maximum (FWHM) on 1070 cm⁻¹ center wavenumber, coincident with important chemical spectra of downhole hydrocarbon fluids and emulsions. Figures of merit analyses for the uncooled microbolometer result in predicted maximum detectivity D*=1×10¹⁰ cm*sqrt (Hz)/W and noise equivalent difference temperature NEDT of 1 mK at a modulation frequency of 500 Hz and a microbolometer temperature of 60 C. These uncooled microbolometer parameters indicate mid-IR interferometers can be miniaturized for downhole applications of in situ FT-THz spectroscopy.

Embodiments

An embodiment described in examples herein provides a microelectromechanical (MEMS) interferometer. The MEMS interferometer includes a pair of movable mirrors that are positioned along perpendicular axes, wherein each of the pair of movable mirrors is coupled to a mechanism. The mechanism includes an electrostatic actuator driving a displacement amplification mechanism, and the displacement amplification mechanism driving each of the pair of the movable mirrors. The MEMS interferometer includes a beam splitter that is positioned at an intersection of the perpendicular axes extending through each movable mirror and the beam splitter. The MEMS interferometer also includes a metasurface microbolometer placed in line with the beam splitter to measure an intensity of a recombined beam from the pair of movable mirrors.

In an aspect, the MEMS interferometer includes a single chip. In an aspect, the single chip is 12 mm×12 mm.

In an aspect, the electrostatic actuator includes a central actuator attached to a movable comb, wherein the movable comb include grounded tines. The electrostatic actuator also includes a positive comb including positive tines, wherein the positive tines are interspersed with the grounded tines on a first side of the movable comb. The electrostatic actuator also includes a negative comb including negative tines, wherein the negative tines are interspersed with the grounded tines on a second side of the movable comb. A sway stabilizer is attached to the central actuator at one end, and a coupling from the central actuator is attached to the displacement amplification mechanism at an opposite end from the sway stabilizer.

In an aspect, the displacement amplification mechanism includes a symmetric fulcrum coupled to a central actuator of the electrostatic actuator, and three serpentine release flexures, wherein the serpentine release flexures amplify the displacement from the central actuator to increase a motion of the movable mirror. In an aspect, the displacement amplification mechanism increases the motion of the movable mirror by a factor of eight over the motion of the central actuator.

In an aspect, the metasurface microbolometer includes a metasurface tuned to absorb a radiation in a range of frequencies in the mid infrared, a thermometric layer in contact a dielectric layer in contact with the metasurface, wherein the thermometric layer changes in resistivity with temperature changes. The metasurface microbolometer also includes a dielectric substrate supporting the thermometric layer and the metasurface, and a readout integrated circuit to measure a response from the thermometric layer including a voltage drop across the contacts of the bridge with a constant bias current.

In an aspect, the metasurface is an electrically conductive geometric pattern based on a geometrical inversion of rhodonea conformal mapping contours. In an aspect, the metasurface includes gold. In an aspect, the metasurface absorbs radiation through surface plasmon resonances. In an aspect, the metasurface is about 120 nm in thickness. In an aspect, the metasurface is less than 30 nm in thickness. In an aspect, the metasurface has a diameter of about 150 µm. in an aspect, the metasurface has a 35% fill factor. In an aspect, the metasurface has a detectivity (D*) of about $1 \times 10^{10}$ cm*sqrt(Hz)/W at 333 K at a bias current of 75 µA. In an aspect, the metasurface has a noise equivalent difference temperature (NEDT) of about 1 mK at a bias current of 75 µA.

In an aspect, the thermometric layer includes undoped vanadium oxide ($VO_2$). In an aspect, the thermometric layer is about 500 nm in thickness. In an aspect, the thermometric layer is less than 40 nm in thickness.

In an aspect, the dielectric substrate includes silicon nitride ($Si_3N_4$). In an aspect, the dielectric substrate is about 200 nm in thickness. In an aspect, the dielectric substrate is about 100 nm in thickness. In an aspect, the dielectric substrate is separated from the readout integrated circuit by an airgap.

In an aspect, the metasurface microbolometer has a broadband absorption of more than 90% in a wavenumber range of about 1500 to about 600 $cm^{-1}$. In an aspect, the metasurface microbolometer has an absorption bandwidth of 156% of full width half maximum (FWHM) centered on a wavenumber of 1070 $cm^{-1}$.

Other implementations are also within the scope of the following claims.

What is claimed is:

1. A micro-electromechanical system (MEMS) interferometer, comprising:
   a pair of movable mirrors that are positioned along perpendicular axes, wherein each of the pair of movable mirrors is coupled to a mechanism comprising:
      an electrostatic actuator driving a displacement amplification mechanism, wherein the displacement amplification mechanism comprises:
         a symmetric fulcrum coupled to a central actuator of the electrostatic actuator; and
         three serpentine release flexures, wherein the serpentine release flexures amplify a displacement from a central actuator of the electrostatic actuator to increase a motion of the movable mirror; and
      the displacement amplification mechanism driving each of the pair of the movable mirrors; and
   a beam splitter positioned at an intersection of the perpendicular axes extending through each movable mirror and the beam splitter; and
   a metasurface microbolometer placed in line with the beam splitter to measure an intensity of a recombined beam from the pair of movable mirrors.

2. The MEMS interferometer of claim 1, comprising a single chip.

3. The MEMS interferometer of claim 2, wherein the single chip is 12 mm×12 mm.

4. The MEMS interferometer of claim 1, wherein the electrostatic actuator comprises:
   a central actuator attached to a movable comb, wherein the movable comb comprise grounded tines;
   a positive comb comprising positive tines, wherein the positive tines are interspersed with the grounded tines on a first side of the movable comb;
   a negative comb comprising negative tines, wherein the negative tines are interspersed with the grounded tines on a second side of the movable comb;
   a sway stabilizer attached to the central actuator at one end; and
   a coupling from the central actuator to the displacement amplification mechanism at an opposite end from the sway stabilizer.

5. The MEMS interferometer of claim 1, wherein the displacement amplification mechanism increases a motion of the movable mirror by a factor of eight over the motion of the central actuator.

6. The MEMS interferometer of claim 1, wherein the metasurface microbolometer comprises:
   a metasurface tuned to absorb a radiation in a range of frequencies in the mid infrared;
   a dielectric substrate disposed in contact with the metasuface;
   a thermometric layer in contact with the dielectric substrate, wherein the dielectric substrate separates the metasurface from the thermoelectric layer, and wherein the thermometric layer changes in resistivity with temperature changes; and
   a readout integrated circuit to measure a response from the thermometric layer comprising a voltage drop across the contacts of the bridge with a constant bias current.

7. The MEMS interferometer of claim 6, wherein the metasurface is an electrically conductive geometric pattern based on a geometrical inversion of the rhodonea conformal mapping contours.

8. The MEMS interferometer of claim 6, wherein the metasurface comprises gold.

9. The MEMS interferometer of claim 6, wherein the metasurface absorbs radiation through surface plasmon resonances.

10. The MEMS interferometer of claim 6, wherein the metasurface is 120 nm in thickness.

11. The MEMS interferometer of claim 6, wherein the metasurface is less than 30 nm in thickness.

12. The MEMS interferometer of claim 6, wherein the metasurface has a diameter of 150 µm.

13. The MEMS interferometer of claim 6, wherein the metasurface has a 35% fill factor.

14. The MEMS interferometer of claim 6, wherein the metasurface has a detectivity (D*) of $1 \times 10^{10}$ cm*sqrt(Hz)/W at 333 K at a bias current of 75 µA.

15. The MEMS interferometer of claim 6, wherein the metasurface has a noise equivalent difference temperature (NEDT) of 1 mK at a bias current of 75 µA.

16. The MEMS interferometer of claim 6, wherein the thermometric layer comprises undoped vanadium oxide ($VO_2$).

17. The MEMS interferometer of claim 6, wherein the thermometric layer is 500 nm in thickness.

18. The MEMS interferometer of claim 6, wherein the thermometric layer is less than 40 nm in thickness.

19. The MEMS interferometer of claim 6, wherein the dielectric substrate comprises silicon nitride ($Si_3N_4$).

20. The MEMS interferometer of claim 6, wherein the dielectric substrate is about nm in thickness.

21. The MEMS interferometer of claim 6, wherein the dielectric substrate is 100 nm in thickness.

22. The MEMS interferometer of claim 6, wherein the dielectric substrate is separated from the readout integrated circuit by an airgap.

23. The MEMS interferometer of claim 1, wherein the metasurface microbolometer has a broadband absorption of more than 90% in a wavenumber range of 1500 to 600 $cm^{-1}$.

24. The MEMS interferometer of claim 1, wherein the metasurface microbolometer has an absorption bandwidth of 156% of full width half maximum (FWHM) centered on a wavenumber of 1070 $cm^{-1}$.

* * * * *

UNITED STATES PATENT AND TRADEMARK OFFICE
CERTIFICATE OF CORRECTION

PATENT NO. : 11,774,289 B2
APPLICATION NO. : 17/453285
DATED : October 3, 2023
INVENTOR(S) : Dwight W. Swett Page 1 of 1

It is certified that error appears in the above-identified patent and that said Letters Patent is hereby corrected as shown below:

On the Title Page

Column 2, Item (57), Abstract, Line 1, replace "microelectromechanical" with
-- micro-electromechanical system --.

In the Claims

Column 12, Lines 23-24, Claim 6, replace "metasuface;" with -- metasurface; --.

Signed and Sealed this
Sixth Day of February, 2024

Katherine Kelly Vidal
*Director of the United States Patent and Trademark Office*